US011604609B1

(12) United States Patent
Bi

(10) Patent No.: US 11,604,609 B1
(45) Date of Patent: Mar. 14, 2023

(54) TECHNIQUES FOR COMMAND SEQUENCE ADJUSTMENT

(71) Applicant: Micron Technology, Inc., Boise, ID (US)

(72) Inventor: Yanhua Bi, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/497,610

(22) Filed: Oct. 8, 2021

(51) Int. Cl.
*G06F 3/06* (2006.01)

(52) U.S. Cl.
CPC ............ *G06F 3/0659* (2013.01); *G06F 3/064* (2013.01); *G06F 3/0604* (2013.01); *G06F 3/0634* (2013.01); *G06F 3/0652* (2013.01); *G06F 3/0673* (2013.01)

(58) Field of Classification Search
CPC .... G06F 3/0659; G06F 3/0604; G06F 3/0634; G06F 3/064; G06F 3/0652; G06F 3/0673
See application file for complete search history.

(56) References Cited

U.S. PATENT DOCUMENTS

| 6,112,265 | A | * | 8/2000 | Harriman | G06F 3/0674 |
| | | | | | 710/39 |
| 2012/0331343 | A1 | * | 12/2012 | Norton | G01R 31/318371 |
| | | | | | 714/25 |
| 2013/0170274 | A1 | * | 7/2013 | Yu | G11C 11/406 |
| | | | | | 365/230.01 |
| 2020/0027519 | A1 | * | 1/2020 | Zhang | G11C 29/021 |
| 2021/0241840 | A1 | * | 8/2021 | Bae | G11C 29/52 |

* cited by examiner

*Primary Examiner* — Edward J Dudek, Jr.
(74) *Attorney, Agent, or Firm* — Holland & Hart, LLP

(57) ABSTRACT

Methods, systems, and devices for techniques for command sequence adjustment are described. A memory system or a host system may adjust an order of a set commands in a queue if the memory system or host system determines that a subset of the commands in the queue are part of a test mode, for example by determining whether each command of the subset corresponds to a same size of data. The set of commands may be reordered such that the subset of commands associated with the test mode are continuous or back-to-back. In some cases, the subset of commands associated with test mode may be reordered such that logical addresses (e.g., logical block addresses) of the subset of commands are continuous.

25 Claims, 8 Drawing Sheets

TECHNIQUES FOR COMMAND SEQUENCE ADJUSTMENT

FIELD OF TECHNOLOGY

The following relates generally to one or more systems for memory and more specifically to techniques for command sequence adjustment.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

A memory system may measure system performance (e.g., read performance, write performance) by receiving and performing a set commands from a host system as part of a test mode. For example, the test mode may include performing a quantity of write commands to write a target test file to a newly opened block of memory, reading back the target test file one or more times (e.g., three times) to calculate an average sequence read performance, and re-writing (e.g., overwriting) the target test file one or more times (e.g., three times) to calculate an average sequence write performance. However, in some cases, the host system may also transmit commands from background tasks (e.g., commands not part of the test mode) during the test mode. In some cases, the commands associated with the background tasks may be performed between commands associated with the test mode, which may reduce system performance by causing the memory system to switch between performing test mode commands and background task commands.

The present disclosure describes techniques for adjusting the order of a set of commands in a queue (e.g., a queue at the memory system or a queue at the host system) if the memory system or host system determines that a subset of the set of commands are associated with a test mode. For example, the memory system or host system may adjust the sequence or order of the set of commands such that commands associated with the test mode are continuous (e.g., such that each of the test mode commands are performed sequentially, or back-to-back). Additionally, the memory system or host system may adjust the order of the set of commands such that logical addresses (each of which may be referred to as a logical block address (LBA)) of the test mode commands are continuous. In a non-limiting example, a first command in the re-ordered set of commands may correspond to LBAs of 0 through 127, a second command in the re-ordered set of commands may correspond to LBAs of 128 through 255, and so on. Adjusting the sequence of commands as described herein may improve test mode performance, for example by allowing the memory system to execute the test mode continuously.

Figure 1:
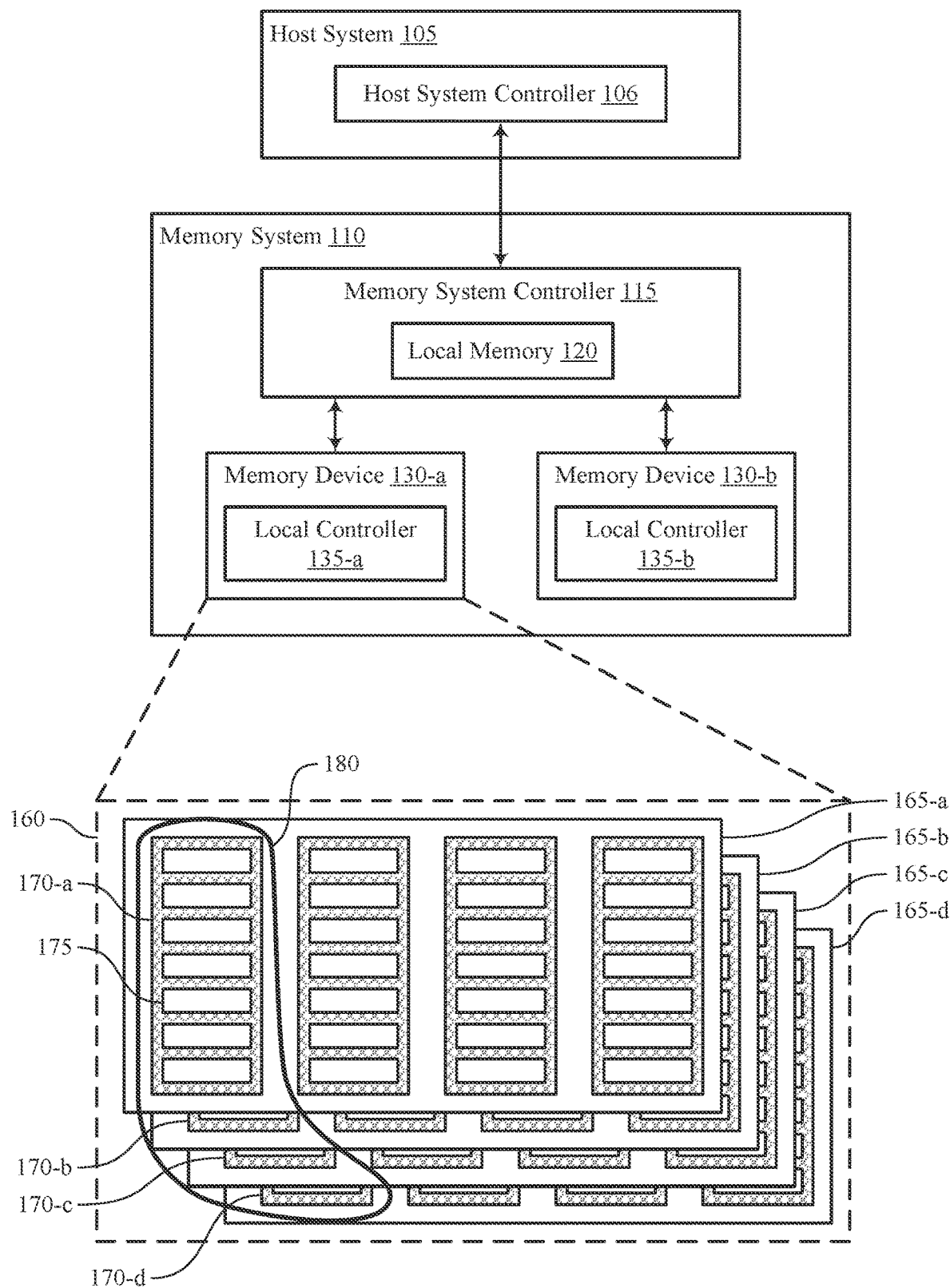
FIG. 1 illustrates an example of a system that supports techniques for command sequence adjustment in accordance with examples as disclosed herein.
Figure 2:
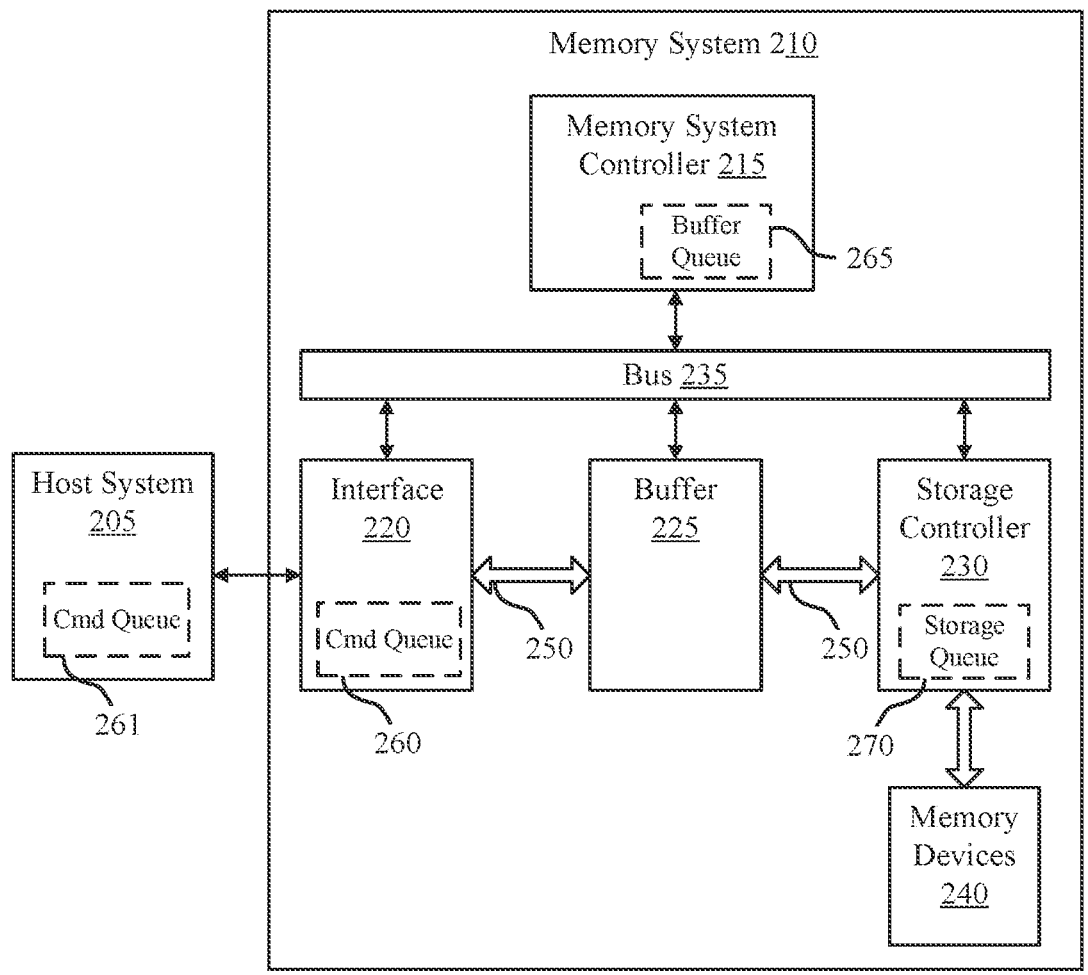
FIG. 2 illustrates an example of a system that supports techniques for command sequence adjustment in accordance with examples as disclosed herein.

Features of the disclosure are initially described in the context of systems, devices, and circuits with reference to FIGS. 1 through 2. Features of the disclosure are described in the context of process flows with reference to FIGS. 3 and 4. These and other features of the disclosure are further illustrated by and described in the context of an apparatus diagram and flowchart that relate to techniques for command sequence adjustment with reference to FIGS. 5-8.

FIG. 1 illustrates an example of a system 100 that supports techniques for command sequence adjustment in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., physical block addresses or physical page addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support techniques for command sequence adjustment. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, a memory system 110 or host system 105 may support adjusting the order of a set of commands in a queue (e.g., a queue at the memory system 110 containing commands transmitted by the host system 105 or a queue at the host system 105 containing commands to transmit to the memory system 110) if the memory system 110 or the host system 105 determines that a subset of the set of commands are associated with a test mode. For example, the memory system 110 or the host system 105 may adjust the sequence or order of the set of commands such that commands associated with the test mode are continuous (e.g., such that each of the test mode commands are performed sequentially, or back-to-back). Additionally, the memory system 110 or the host system 105 may adjust the order of the set of commands such that LBAs of the test mode commands are continuous. Adjusting the sequence of commands as described herein may improve test mode performance, for example by allowing the memory system 110 to execute the test mode continuously.

FIG. 2 illustrates an example of a system 200 that supports techniques for command sequence adjustment in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on (e.g., using) the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses or physical page addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some cases, a host system 205 may include a command queue 261. The command queue 261 may store commands, such as access commands, prior to transmitting the commands to a memory system 210 (e.g., a command queue 260 of a memory system 210). In some cases, the host system 205 may transmit commands from the command queue 261 to the interface 220 of the memory system 210.

In some cases, a memory system 210 or host system 205 may support adjusting the order of a set of commands in a queue (e.g., a command queue 260 at the memory system 210 containing commands transmitted by the host system 205 from the command queue 261 or a command queue 261 at the host system 205 containing commands to transmit to the memory system 210) if the memory system 210 or the host system 205 determines that a subset of the set of commands are associated with a test mode. For example, the memory system 210 or the host system 205 may adjust the sequence or order of the set of commands in the command queue 260 or the command queue 261 such that commands associated with the test mode are continuous (e.g., such that each of the test mode commands are performed sequentially, or back-to-back). In some cases, the order of commands may be adjusted by the memory system controller 215, or a controller associated with the host system 205. In cases where a controller associated with the host system 205 adjusts the order of commands, the controller associated with the host system 205 may adjust the order of the commands stored in the commands queue 261.

Additionally, the memory system 210 or the host system 205 may adjust the order of the set of commands such that LBAs of the test mode commands are continuous. Adjusting the sequence of commands as described herein may improve test mode performance, for example by allowing the memory system 210 to execute the test mode continuously.

Figure 3:
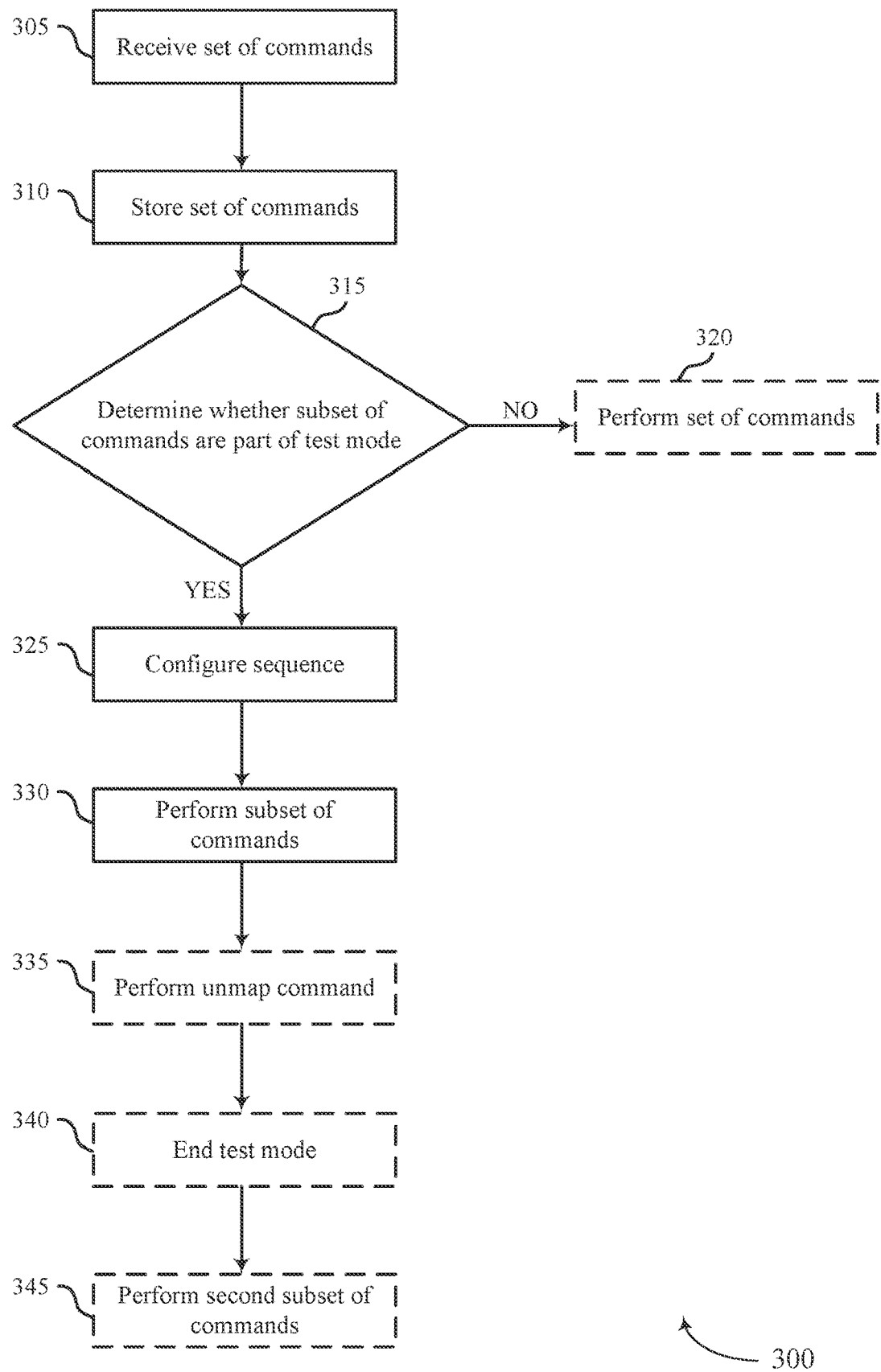
FIG. 3 illustrates an example of a process flow that supports techniques for command sequence adjustment in accordance with examples as disclosed herein.

FIG. 3 illustrates an example of a process flow 300 that supports techniques for command sequence adjustment in accordance with examples as disclosed herein. The process flow 300 may be performed by components of a memory system, such as a memory system 110 described with reference to FIGS. 1 and 2. For example, the process flow 300 may be performed by a controller of a memory system or a memory device (or both) such as a memory system controller 115 or a local controller 135, respectively, as described with reference to FIG. 1. The process flow 300 may be implemented to reduce latency and power consumption and increase system performance, among other benefits. Aspects of the process flow 300 may be implemented by a controller, among other components. Additionally or alternatively, aspects of the process flow 300 may be implemented as instructions stored in memory (e.g., firmware stored in a memory coupled with the memory system controller 115 or the local controller 135). For example, the instructions, if executed by a controller (e.g., a memory system controller 115, a local controller 135), may cause the controller to perform the operations of the process flow 300. In the following description of process flow 300, the operations may be performed in a different order than the order shown. For example, specific operations may also be left out of process flow 300, or other operations may be added to process flow 300.

At 305, a set of commands may be received. For example, a memory system may receive the set of commands from a host system. In some examples, the set of commands may include access commands for data stored in blocks of one or more memory devices of the memory devices, such as read commands, write commands, or erase commands, among other examples.

At 310, the set of commands may be stored. For example, the memory system may store the set of commands using a first sequence in a queue, such as the command queue 260, the buffer queue 265, the storage queue 270, or a combination thereof, as described with reference to FIG. 2. For example, if the set of commands includes six commands (i.e., a first command through a sixth command), the first sequence may indicate that the first command is to be performed, then the second is to be performed (e.g., after completing the first command), then the third command is to be performed, and so on until each of the commands of the set of commands has been performed. In some cases, the first sequence may reflect the order in which each command of the set of commands was received from the host system.

At 315, it may be determined whether commands in a subset of the set of commands are part of a test mode. For example, the memory system may determine whether the subset of commands are write commands associated with a test mode (e.g., a benchmarking mode) used to measure the performance of the memory system, such as write speed or read performance, among other examples. The test mode may include performing a quantity of write commands to write a target test file to a newly opened block of memory, reading back the target test file one or more times (e.g., three times) to calculate an average sequence read performance, and re-writing (e.g., overwriting) the target test file one or more times (e.g., three times) to calculate an average sequence write performance.

In some cases, the memory system may determine whether the subset of commands are part of the test mode by determining whether each of the commands of the subset is a write command associated with a same size of data. In a non-limiting example, as part of writing a target test file, the host system may issue one or more write commands to write the target test file using a common chunk size (e.g., a 512 kilobyte (KB) chunk size). Thus, if the memory system detects that each command of the subset of commands indicates a same size of data to be written, the memory system may determine that the subset of commands are part of the test mode.

In some cases, it may be determined at 315 that the commands in a subset of the set of commands are not part of the test mode. Thus, at 320, the set of commands may be performed. For example, the memory system may perform the set of commands by performing each of the commands according to the first sequence (e.g., according to the order in which the commands were received from the host system).

At 325, if it is determined that the commands in a subset of the set of commands are part of the test mode, a second sequence of the set of commands may be configured. For example, the memory system may configure the second sequence by adjusting the order of the first sequence (e.g., the order in which the set of commands is to be performed). In some cases, the second sequence may indicate that LBAs for each command of the subset of commands are continuous (e.g., the LBAs for a first command to be performed are lower than the LBAs for a second command to be performed after the first command).

In a non-limiting example, the set of commands may include four commands stored in the queue according to a first sequence (e.g., a first command through a fourth command are stored sequentially). The first command may indicate LBAs of 0 to 127 (e.g., the first command may have a chunk size of 512 KB), the second command indicate LBAs of 256 to 383 (e.g., the second command may have a chunk size of 512 KB), the third command may indicate an LBA of 10240 and have a chunk size of 4 KB, and the fourth command may indicate LBAs of 128 to 255 (e.g., the fourth command may have a chunk size of 512 KB).

Because the first command, the second command, and the fourth command each indicate a same size of data (e.g., the 512 KB chunk size), the memory system may determine that the first command, the second command, and the fourth command are part of the test mode. Thus, the memory system may configure the order in which the commands are stored in the queue using a second sequence, so that the order indicates that the first command is to be performed, followed by the fourth command (e.g., because the LBAs of the fourth command are subsequent to the first command), followed by the second command, followed by the third command. In other words, the memory system may reorder the subset of commands such that the LBA of a command is equal to the LBA of a previous command plus the previous command's chunk size.

At 330, the subset of commands may be performed. For example, the memory system may perform the subset of commands in the order indicated by the second sequence (e.g., configured at 325). In some cases, performing the subset of commands may include writing the data associated with at least one command of the subset of commands to a newly opened block (e.g., a first block) of memory cells. For example, as part of the test mode, the memory system may open the first block of memory to record the target test file, and subsequently write the data indicated in the subset of commands to the first block.

In some cases, writing the subset of commands to the first block may include writing the data of each command to continuous physical addresses (e.g., the physical addresses of the memory cells indicated by the LBAs of the subset of commands may be continuous), such as continuous physical page addresses. For example, the first command performed in the subset may include writing data to a first set of physical address, the second command performed in the subset may include writing data to a second set of physical addresses directly subsequent to the first set of physical addresses, and so on, until each write command in the subset has been performed. In some cases, writing the target test file to continuous physical addresses may increase write performance, as well as increase read performance if the target test file is subsequently read.

In some cases, at 335, an unmap command may be received. For example, the memory system may receive an unmap command from the host system. The unmap command may indicate that the data written as part of the test mode (e.g., the data written at 330) is to be erased. In some examples, receiving the unmap command may indicate an end to the test mode. Thus, in response to receiving the unmap command, the memory system may erase the data written as part of the test mode from the first block.

In some cases, at 340, the test mode may end. For example, the memory system may determine to end the test mode in response to receiving the unmap command, performing the unmap command, or both. Additionally or alternatively, the memory system may determine to end to test mode in response to a second subset of commands satisfying a threshold quantity of commands. For example, if the memory system detects a quantity of random commands (e.g., a quantity of commands which are not part of the test mode, such as commands associated with background tasks), the memory system may determine to end the test mode. In some examples, the threshold quantity may be 16, although it should be appreciated that other quantities are possible.

In some cases, at 345, the second subset of commands may be performed. For example, after exiting the test mode, the memory system may perform the rest of the commands not associated with the test mode (e.g., the second subset) stored in the queue at 310. The second set of commands may be examples of access commands, such as read, write, or erase commands, or any other command received by the memory system from the host system. In some examples, such as if the second subset of commands includes a write command, the second subset of commands may be performed on a block different than the block used to perform the write commands associates with the test mode.

Aspects of the process flow 300 may be implemented by a controller, among other components. Additionally or alternatively, aspects of the process flow 300 may be implemented as instructions stored in memory (e.g., firmware stored in a memory coupled with the memory system). For example, the instructions, when executed by a controller (e.g., the memory system controller 115), may cause the controller to perform the operations of the process flow 300.

Figure 4:
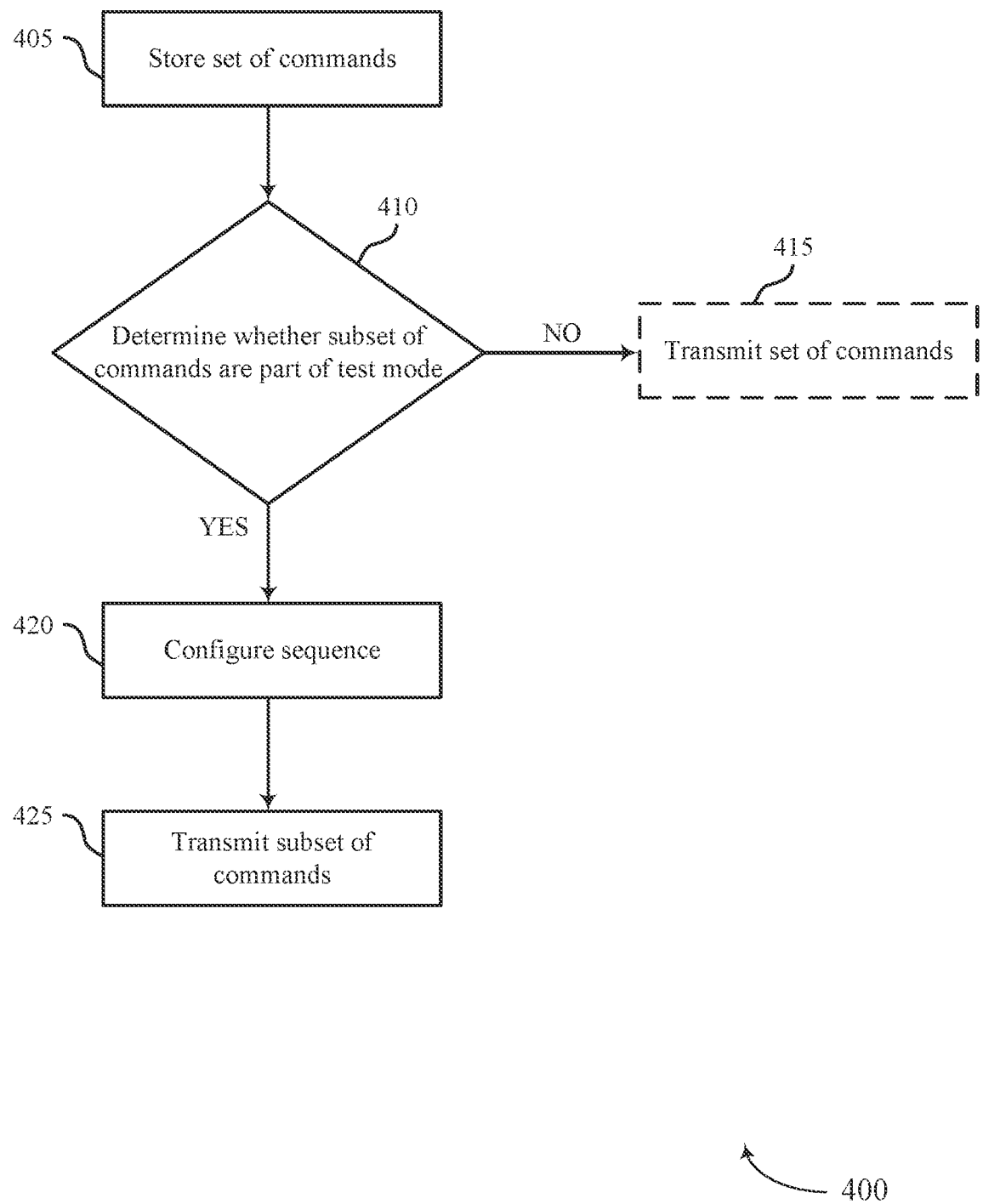
FIG. 4 illustrates an example of a process flow that supports techniques for command sequence adjustment in accordance with examples as disclosed herein.

FIG. 4 illustrates an example of a process flow 400 that supports techniques for command sequence adjustment in accordance with examples as disclosed herein. The process flow 400 may be performed by components of a memory system, such as a memory system 110 described with reference to FIGS. 1 and 2. For example, the process flow 400 may be performed by a controller of a host system such as a host system controller 106 as described with reference to FIG. 1. The process flow 400 may be implemented to reduce latency and power consumption and increase system performance, among other benefits. Aspects of the process flow 400 may be implemented by a controller, among other components.

Additionally or alternatively, aspects of the process flow 400 may be implemented as instructions stored in memory (e.g., firmware stored in a memory coupled with the memory system controller 115 or the local controller 135). For example, the instructions, if executed by a controller (e.g., a memory system controller 115, a local controller 135), may cause the controller to perform the operations of the process flow 400. In the following description of process flow 400, the operations may be performed in a different order than the order shown. For example, specific operations may also be left out of process flow 400, or other operations may be added to process flow 400.

At 405, a set of commands may be stored. For example, the host system may store the set of commands using a first sequence in a queue, such as a queue of the host system. For example, if the set of commands includes six commands (i.e., a first command through a sixth command), the first sequence may indicate that the first command is to be transmitted to the memory system, then the second command is to be transmitted (e.g., after transmitting the first command), then the third command is to be transmitted, and so on until each of the commands of the set of commands has been transmitted to the memory system.

At 410, it may be determined whether a subset of the set of commands are part of a test mode for the memory system. For example, the host system may determine whether the subset of commands are write commands associated with a test mode (e.g., a benchmarking mode) used to measure the performance of the memory system, such as write speed or read performance, among other examples. The test mode may include performing a quantity of write commands to write a target test file to a newly opened block of memory, reading back the target test file one or more times (e.g., three times) to calculate an average sequence read performance, and re-writing (e.g., overwriting) the target test file one or more times (e.g., three times) to calculate an average sequence write performance.

In some cases, the host system may determine whether the subset of commands are part of the test mode by determining whether each of the commands of the subset is a write command associated with a same size of data. In a non-limiting example, as part of writing a target test file, the host system may issue one or more write commands to write the target test file using a common chunk size (e.g., a 512 KB chunk size). Thus, if the host system detects that each command of the subset of commands indicates a same size of data to be written, the host system may determine that the subset of commands are part of the test mode.

In some cases, it may be determined at 410 that the commands in a subset of the set of commands are not part of the test mode. Thus, at 415, the set of commands may be transmitted to the memory system. For example, the host system may transmit the set of commands according to the first sequence.

At 420, if it is determined that the commands in a subset of the set of commands are part of the test mode, a second sequence of the set of commands may be configured. For example, the host system may configure the second sequence by adjusting the order of the first sequence (e.g., the order in which the set of commands are to be transmitted). In some cases, the second sequence may indicate that LBAs for each command of the subset of commands are continuous (e.g., the LBAs for a first command to be transmitted are lower than the LBAs for a second command to be transmitted after the first command).

In a non-limiting example, the set of commands may include four commands stored in the queue according to a first sequence (e.g., a first command through a fourth command are stored sequentially). The first command may indicate LBAs of 0 to 127 (e.g., the first command may have a chunk size of 512 KB), a second command may indicate LBAs of 256 to 383 (e.g., the second command may have a chunk size of 512 KB), the third command may indicate an LBA of 10240 and have a chunk size of 4 KB, and the fourth command may indicate LBAs of 128 to 255 (e.g., the fourth command may have a chunk size of 512 KB).

Because the first command, the second command, and the fourth command each indicate a same size of data (e.g., the 512 KB chunk size), the host system may determine that the first command, the second command, and the fourth command are part of the test mode. Thus, the host system may configure the order in which the commands are stored in the queue using a second sequence, so that the order indicates that the first command is to be transmitted, followed by the fourth command (e.g., because the LBAs of the fourth command are subsequent to the first command), followed by the second command, followed by the third command. In other words, the host system may reorder the subset of commands such that the LBA of a command is equal to the LBA of a previous command plus the previous command's chunk size.

At 425, the subset of commands may be transmitted. For example, the host system may transmit the subset of commands to the memory system in the order indicated by the second sequence (e.g., configured at 420). In some cases, the host system may also transmit a second subset of commands (e.g., the commands of the set of commands which are not part of the test mode). The second subset of commands may be transmitted after the first subset of commands, for example as indicated by the second sequence.

Aspects of the process flow 400 may be implemented by a controller, among other components. Additionally or alternatively, aspects of the process flow 400 may be implemented as instructions stored in memory (e.g., firmware stored in a memory coupled with the memory system). For example, the instructions, when executed by a controller (e.g., the host system controller 106), may cause the controller to perform the operations of the process flow 400.

Figure 5:
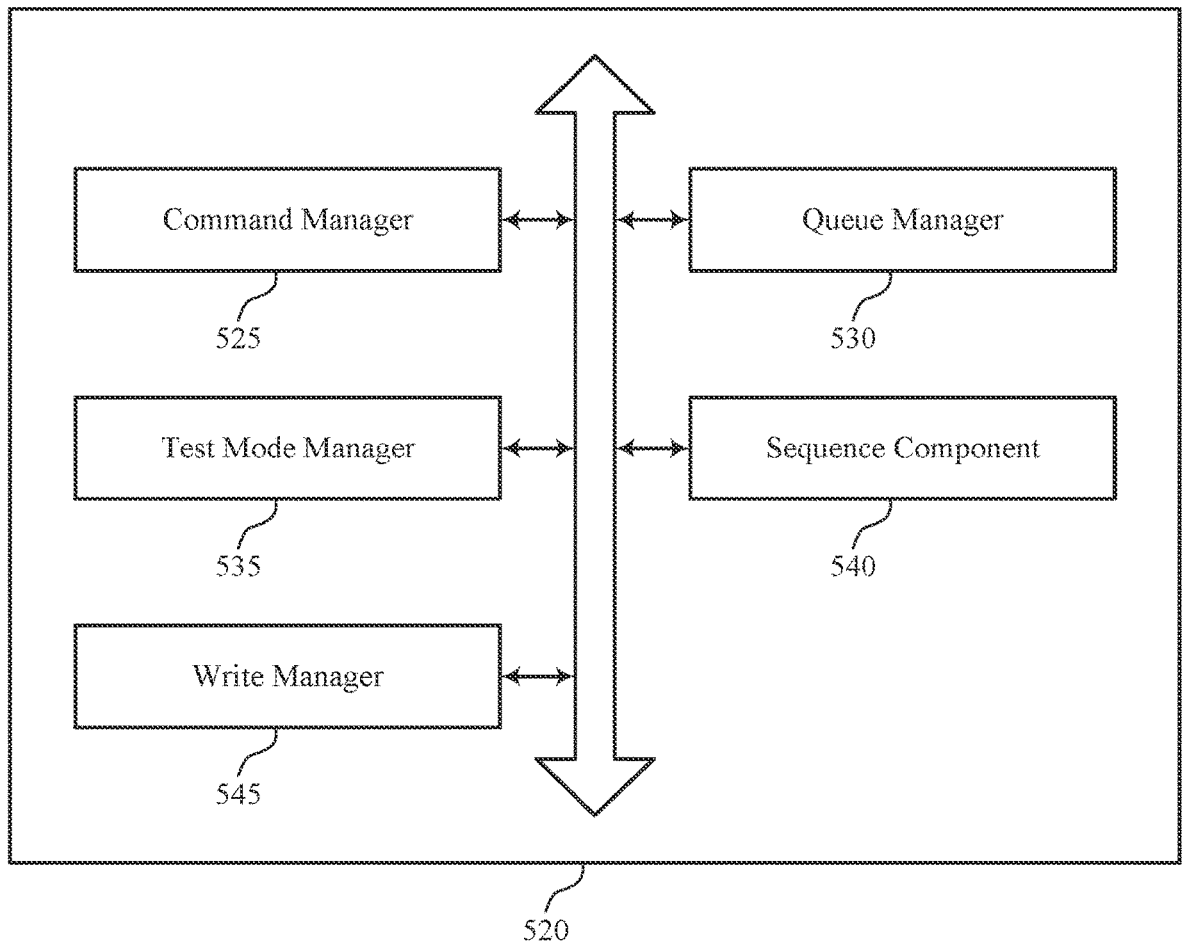
FIG. 5 shows a block diagram of a memory system that supports techniques for command sequence adjustment in accordance with examples as disclosed herein.

FIG. 5 shows a block diagram 500 of a memory system 520 that supports techniques for command sequence adjustment in accordance with examples as disclosed herein. The memory system 520 may be an example of aspects of a memory system as described with reference to FIGS. 1 through 4. The memory system 520, or various components thereof, may be an example of means for performing various aspects of techniques for command sequence adjustment as described herein. For example, the memory system 520 may include a command manager 525, a queue manager 530, a test mode manager 535, a sequence component 540, a write manager 545, or any combination thereof. Each of these components may communicate, directly or indirectly, with one another (e.g., via one or more buses).

The command manager 525 may be configured as or otherwise support a means for receiving, at a memory system, a set of commands. The queue manager 530 may be configured as or otherwise support a means for storing the set of commands in a queue according to a first sequence that is based at least in part on receiving the set of commands. The test mode manager 535 may be configured as or otherwise support a means for determining whether a subset of commands in the set of commands are associated with a test mode. The sequence component 540 may be configured as or otherwise support a means for configuring, based at least in part on determining that the subset of commands are associated with the test mode, a second sequence of the set of commands in the queue, the second sequence based at least in part on a respective logical address associated with each command of the subset of commands. In some examples, the command manager 525 may be configured as or otherwise support a means for performing, as part of the test mode, the subset of commands according to the second sequence.

In some examples, to support configuring the second sequence, the sequence component 540 may be configured as or otherwise support a means for adjusting an order of the subset of commands in the queue such that a first logical address associated with a first command in the queue is less than a second logical address associated with a second command in the queue, where the second command is performed after the first command according to the second sequence.

In some examples, to support performing the subset of commands, the write manager 545 may be configured as or otherwise support a means for writing first data associated with at least one command of the subset of commands to a first block based at least in part on determining that the subset of commands is associated with the test mode.

In some examples, the command manager 525 may be configured as or otherwise support a means for performing a second subset of commands in the set of commands, the second subset different than the subset.

In some examples, to support performing the second subset of commands, the write manager 545 may be configured as or otherwise support a means for writing second data associated with at least one command of the second subset of commands to a second block of memory cells different than the first block.

In some examples, the command manager 525 may be configured as or otherwise support a means for receiving an unmap command identifying data associated with the subset of commands. In some examples, the command manager 525 may be configured as or otherwise support a means for erasing, from the first block, the first data based at least in part on receiving the unmap command.

In some examples, the subset of commands include one or more write commands, each write command of the one or more write commands identifying a same size of data.

In some examples, the command manager 525 may be configured as or otherwise support a means for determining to end the test mode based at least in part on a second subset of commands satisfying a threshold quantity of commands.

In some examples, determining to end the test mode is further based at least in part on the second subset of commands including an unmap command.

In some examples, determining that the subset of commands in the set of commands are associated with the test mode is based at least in part on a respective size of data associated with each command of the subset satisfying a threshold.

In some examples, determining that the subset of commands in the set of commands are associated with the test mode is based at least in part on a quantity of commands of the subset satisfying a threshold.

Figure 6:
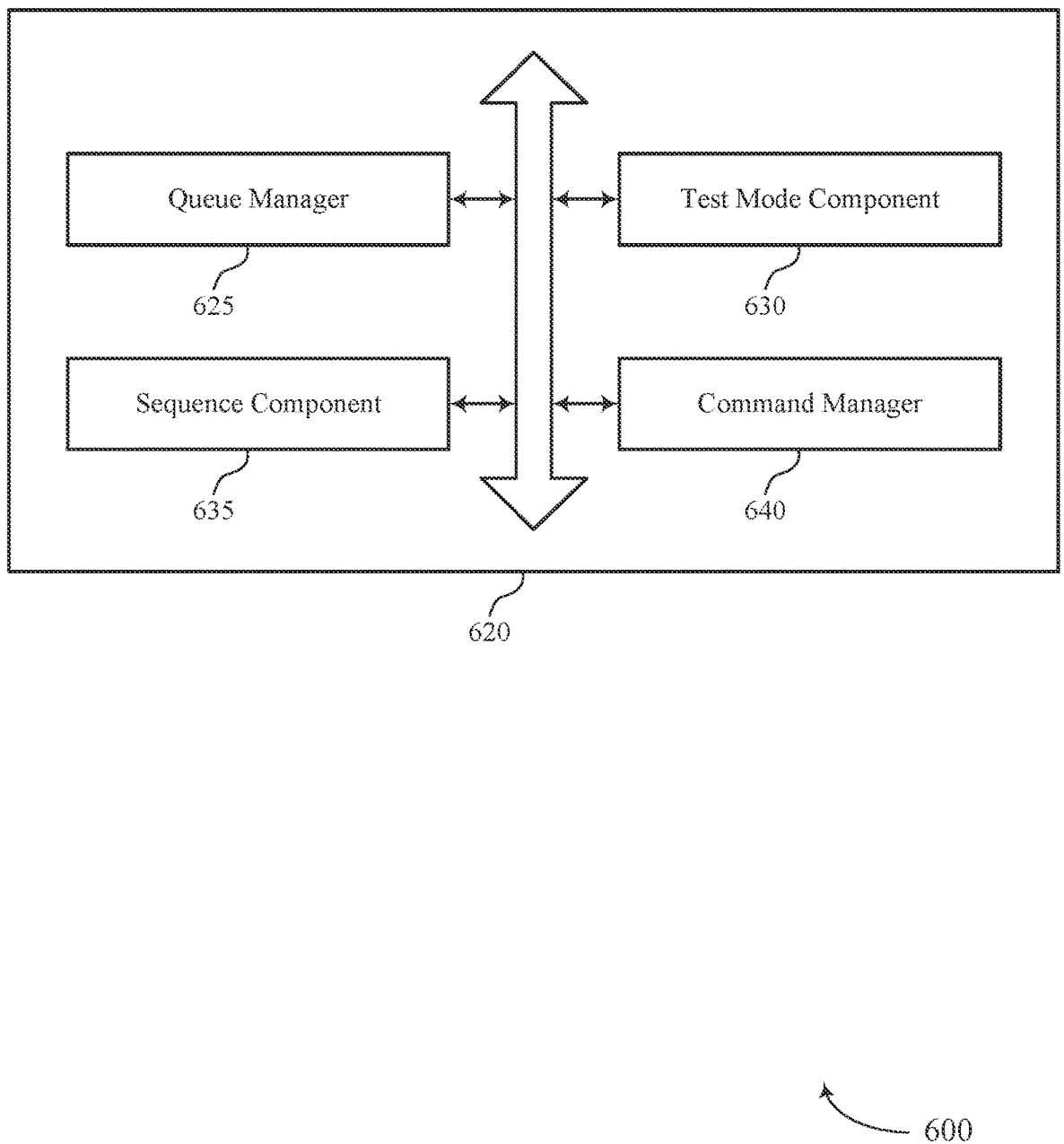
FIG. 6 shows a block diagram of a host system that supports techniques for command sequence adjustment in accordance with examples as disclosed herein.

FIG. 6 shows a block diagram 600 of a host system 620 that supports techniques for command sequence adjustment in accordance with examples as disclosed herein. The host system 620 may be an example of aspects of a host system as described with reference to FIGS. 1 through 4. The host system 620, or various components thereof, may be an example of means for performing various aspects of techniques for command sequence adjustment as described herein. For example, the host system 620 may include a queue manager 625, a test mode component 630, a sequence component 635, a command manager 640, or any combination thereof. Each of these components may communicate, directly or indirectly, with one another (e.g., via one or more buses).

The queue manager 625 may be configured as or otherwise support a means for storing, in a queue at a host system, a set of commands for storing data at a memory system according to a first sequence. The test mode component 630 may be configured as or otherwise support a means for determining whether a subset of commands in the set of commands are associated with a test mode. The sequence component 635 may be configured as or otherwise support a means for configuring, based at least in part on determining that the subset of commands are associated with the test mode, a second sequence of the set of commands in the queue, the second sequence based at least in part on a respective logical address associated with each command of the subset of commands. The command manager 640 may be configured as or otherwise support a means for transmitting the subset of commands to the memory system according to the second sequence.

In some examples, determining that the subset of commands in the set of commands are associated with the test mode is based at least in part on a respective size of data associated with each command of the subset satisfying a threshold.

In some examples, to support configuring the second sequence, the sequence component 635 may be configured as or otherwise support a means for adjusting an order of the subset of commands in the queue such that a first logical address associated with a first command in the queue is less than a second logical address associated with a second command in the queue, where the second command is configured to be performed after the first command according to the second sequence.

Figure 7:
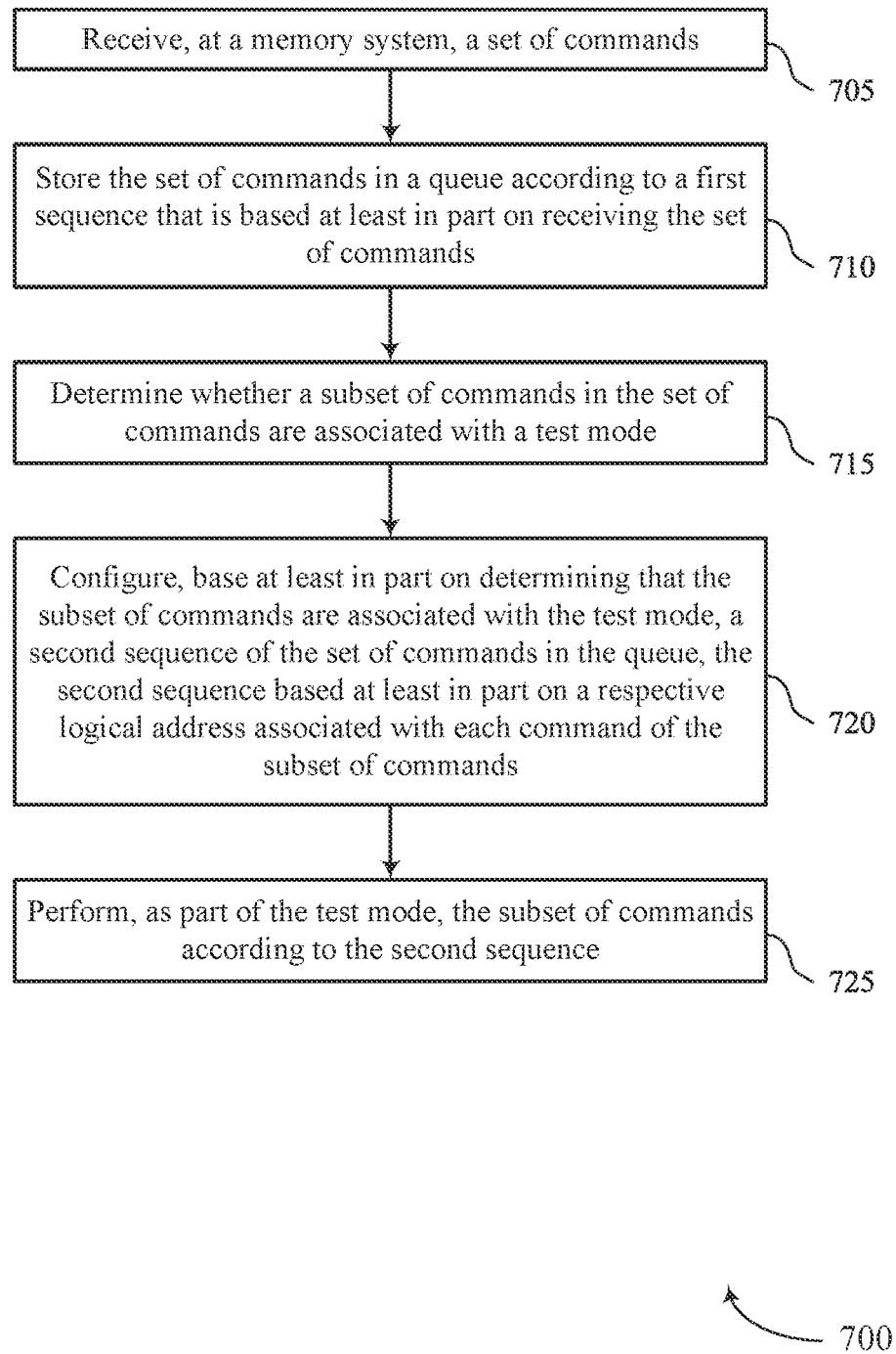
FIGS. 7 and 8 show flowcharts illustrating a method or methods that support techniques for command sequence adjustment in accordance with examples as disclosed herein.

FIG. 7 shows a flowchart illustrating a method 700 that supports techniques for command sequence adjustment in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 705, the method may include receiving, at a memory system, a set of commands. The operations of 705 may be performed in accordance with examples as disclosed herein. In some examples, aspects of the operations of 705 may be performed by a command manager 525 as described with reference to FIG. 5.

At 710, the method may include storing the set of commands in a queue according to a first sequence that is based at least in part on receiving the set of commands. The operations of 710 may be performed in accordance with examples as disclosed herein. In some examples, aspects of the operations of 710 may be performed by a queue manager 530 as described with reference to FIG. 5.

At 715, the method may include determining whether a subset of commands in the set of commands are associated with a test mode. The operations of 715 may be performed in accordance with examples as disclosed herein. In some examples, aspects of the operations of 715 may be performed by a test mode manager 535 as described with reference to FIG. 5.

At 720, the method may include configuring, based at least in part on determining that the subset of commands are associated with the test mode, a second sequence of the set of commands in the queue, the second sequence based at least in part on a respective logical address associated with each command of the subset of commands. The operations of 720 may be performed in accordance with examples as disclosed herein. In some examples, aspects of the operations of 720 may be performed by a sequence component 540 as described with reference to FIG. 5.

At 725, the method may include performing, as part of the test mode, the subset of commands according to the second sequence. The operations of 725 may be performed in accordance with examples as disclosed herein. In some examples, aspects of the operations of 725 may be performed by a command manager 525 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, at a memory system, a set of commands, storing the set of commands in a queue according to a first sequence that is based at least in part on receiving the set of commands, determining whether a subset of commands in the set of commands are associated with a test mode, configuring, based at least in part on determining that the subset of commands are associated with the test mode, a second sequence of the set of commands in the queue, the second sequence based at least in part on a respective logical address associated with each command of the subset of commands, and performing, as part of the test mode, the subset of commands according to the second sequence.

In some examples of the method 700 and the apparatus described herein, configuring the second sequence may include operations, features, circuitry, logic, means, or instructions for adjusting an order of the subset of commands in the queue such that a first logical address associated with a first command in the queue may be less than a second logical address associated with a second command in the queue, where the second command may be performed after the first command according to the second sequence.

In some examples of the method 700 and the apparatus described herein, performing the subset of commands may include operations, features, circuitry, logic, means, or instructions for writing first data associated with at least one command of the subset of commands to a first block based at least in part on determining that the subset of commands may be associated with the test mode.

Some examples of the method 700 and the apparatus described herein may further include operations, features, circuitry, logic, means, or instructions for performing a second subset of commands in the set of commands, the second subset different than the subset.

In some examples of the method 700 and the apparatus described herein, performing the second subset of commands may include operations, features, circuitry, logic, means, or instructions for writing second data associated with at least one command of the second subset of commands to a second block of memory cells different than the first block.

Some examples of the method 700 and the apparatus described herein may further include operations, features, circuitry, logic, means, or instructions for receiving an unmap command identifying data associated with the subset of commands and erasing, from the first block, the first data based at least in part on receiving the unmap command.

In some examples of the method 700 and the apparatus described herein, the subset of commands include one or more write commands, each write command of the one or more write commands identifying a same size of data.

Some examples of the method 700 and the apparatus described herein may further include operations, features, circuitry, logic, means, or instructions for determining to end the test mode based at least in part on a second subset of commands satisfying a threshold quantity of commands.

Some examples of the method 700 and the apparatus described herein may further include operations, features, circuitry, logic, means, or instructions for determining to end the test mode may be further based at least in part on the second subset of commands including an unmap command.

Some examples of the method 700 and the apparatus described herein may further include operations, features, circuitry, logic, means, or instructions for determining that the subset of commands in the set of commands may be associated with the test mode may be based at least in part on a respective size of data associated with each command of the subset satisfying a threshold.

Some examples of the method 700 and the apparatus described herein may further include operations, features, circuitry, logic, means, or instructions for determining that the subset of commands in the set of commands may be associated with the test mode may be based at least in part on a quantity of commands of the subset satisfying a threshold.

Figure 8:
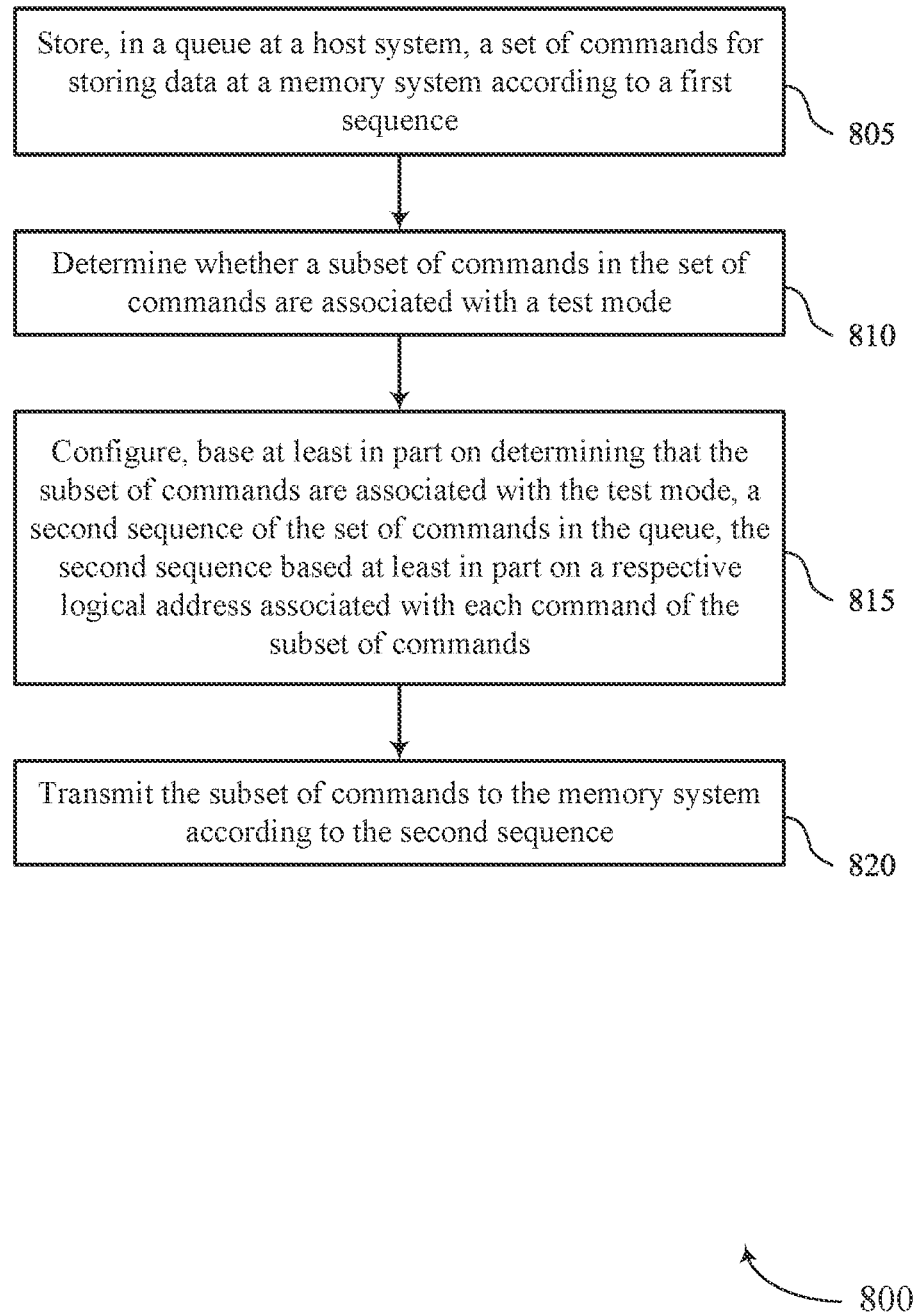

FIG. 8 shows a flowchart illustrating a method 800 that supports techniques for command sequence adjustment in accordance with examples as disclosed herein. The operations of method 800 may be implemented by a host system or its components as described herein. For example, the operations of method 800 may be performed by a host system as described with reference to FIGS. 1 through 4 and 6. In some examples, a host system may execute a set of instructions to control the functional elements of the device to perform the described functions. Additionally or alternatively, the host system may perform aspects of the described functions using special-purpose hardware.

At 805, the method may include storing, in a queue at a host system, a set of commands for storing data at a memory system according to a first sequence. The operations of 805 may be performed in accordance with examples as disclosed herein. In some examples, aspects of the operations of 805 may be performed by a queue manager 625 as described with reference to FIG. 6.

At 810, the method may include determining whether a subset of commands in the set of commands are associated with a test mode. The operations of 810 may be performed in accordance with examples as disclosed herein. In some examples, aspects of the operations of 810 may be performed by a test mode component 630 as described with reference to FIG. 6.

At 815, the method may include configuring, based at least in part on determining that the subset of commands are associated with the test mode, a second sequence of the set of commands in the queue, the second sequence based at least in part on a respective logical address associated with each command of the subset of commands. The operations of 815 may be performed in accordance with examples as disclosed herein. In some examples, aspects of the operations of 815 may be performed by a sequence component 635 as described with reference to FIG. 6.

At 820, the method may include transmitting the subset of commands to the memory system according to the second sequence. The operations of 820 may be performed in accordance with examples as disclosed herein. In some examples, aspects of the operations of 820 may be performed by a command manager 640 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for storing, in a queue at a host system, a set of commands for storing data at a memory system according to a first sequence, determining whether a subset of commands in the set of commands are associated with a test mode, configuring, based at least in part on determining that the subset of commands are associated with the test mode, a second sequence of the set of commands in the queue, the second sequence based at least in part on a respective logical address associated with each command of the subset of commands, and transmitting the subset of commands to the memory system according to the second sequence.

Some examples of the method 800 and the apparatus described herein may further include operations, features, circuitry, logic, means, or instructions for determining that the subset of commands in the set of commands may be associated with the test mode may be based at least in part on a respective size of data associated with each command of the subset satisfying a threshold.

In some examples of the method 800 and the apparatus described herein, configuring the second sequence may include operations, features, circuitry, logic, means, or instructions for adjusting an order of the subset of commands in the queue such that a first logical address associated with a first command in the queue may be less than a second logical address associated with a second command in the queue, where the second command may be configured to be performed after the first command according to the second sequence.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on (e.g., in response to) the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device, and
   a controller coupled with the memory device and configured to cause the apparatus to:
   receive, at a memory system, a set of commands;
   store the set of commands in a queue according to a first sequence that is based at least in part on receiving the set of commands;
   determine whether a subset of commands in the set of commands are associated with a test mode;
   configure, based at least in part on determining that the subset of commands are associated with the test mode, a second sequence of the set of commands in the queue, the second sequence based at least in part on a respective logical address associated with each command of the subset of commands; and
   perform, as part of the test mode, the subset of commands according to the second sequence.

2. The apparatus of claim 1, wherein configuring the second sequence is configured to cause the apparatus to:
   adjust an order of the subset of commands in the queue such that a first logical address associated with a first command in the queue is less than a second logical address associated with a second command in the queue, wherein the second command is performed after the first command according to the second sequence.

3. The apparatus of claim 1, wherein performing the subset of commands is configured to cause the apparatus to:
   write first data associated with at least one command of the subset of commands to a first block based at least in part on determining that the subset of commands is associated with the test mode.

4. The apparatus of claim 3, wherein the controller is further configured to cause the apparatus to:
   perform a second subset of commands in the set of commands, the second subset different than the subset.

5. The apparatus of claim 4, wherein performing the second subset of commands is configured to cause the apparatus to:
   write second data associated with at least one command of the second subset of commands to a second block of memory cells different than the first block.

6. The apparatus of claim 3, wherein the controller is further configured to cause the apparatus to:
   receive an unmap command identifying data associated with the subset of commands; and
   erase, from the first block, the first data based at least in part on receiving the unmap command.

7. The apparatus of claim 1, wherein the subset of commands comprise one or more write commands, each write command of the one or more write commands identifying a same size of data.

8. The apparatus of claim 1, wherein the controller is further configured to cause the apparatus to:
   determine to end the test mode based at least in part on a second subset of commands satisfying a threshold quantity of commands.

9. The apparatus of claim 8, wherein determining to end the test mode is further based at least in part on the second subset of commands comprising an unmap command.

10. The apparatus of claim 1, wherein determining that the subset of commands in the set of commands are associated with the test mode is based at least in part on a respective size of data associated with each command of the subset satisfying a threshold.

11. The apparatus of claim 1, wherein determining that the subset of commands in the set of commands are associated with the test mode is based at least in part on a quantity of commands of the subset satisfying a threshold.

12. A non-transitory computer-readable medium storing code comprising instructions which, when executed by a processor of an electronic device, cause the electronic device to:
   receive, at a memory system, a set of commands;
   store the set of commands in a queue according to a first sequence that is based at least in part on receiving the set of commands;
   determine whether a subset of commands in the set of commands are associated with a test mode;
   configure, based at least in part on determining that the subset of commands are associated with the test mode, a second sequence of the set of commands in the queue, the second sequence based at least in part on a respective logical address associated with each command of the subset of commands; and
   perform, as part of the test mode, the subset of commands according to the second sequence.

13. The non-transitory computer-readable medium of claim 12, wherein the instructions to configure the second sequence are executable by the processor to:
   adjust an order of the subset of commands in the queue such that a first logical address associated with a first command in the queue is less than a second logical address associated with a second command in the queue, wherein the second command is performed after the first command according to the second sequence.

14. The non-transitory computer-readable medium of claim 12, wherein the instructions to perform the subset of commands are executable by the processor to:

write first data associated with at least one command of the subset of commands to a first block based at least in part on determining that the subset of commands is associated with the test mode.

15. The non-transitory computer-readable medium of claim 14, wherein the instructions, when executed by the processor of the electronic device, further cause the electronic device to perform a second subset of commands in the set of commands, the second subset different than the subset.

16. The non-transitory computer-readable medium of claim 15, wherein the instructions to perform the second subset of commands are executable by the processor to:
write second data associated with at least one command of the second subset of commands to a second block of memory cells different than the first block.

17. The non-transitory computer-readable medium of claim 14, wherein the instructions, when executed by the processor of the electronic device, further cause the electronic device to:
receive an unmap command identifying data associated with the subset of commands; and
erase, from the first block, the first data based at least in part on receiving the unmap command.

18. The non-transitory computer-readable medium of claim 12, wherein the subset of commands comprise one or more write commands, each write command of the one or more write commands identifying a same size of data.

19. A method, comprising:
receiving, at a memory system, a set of commands;
storing the set of commands in a queue according to a first sequence that is based at least in part on receiving the set of commands;
determining whether a subset of commands in the set of commands are associated with a test mode;
configuring, based at least in part on determining that the subset of commands are associated with the test mode, a second sequence of the set of commands in the queue, the second sequence based at least in part on a respective logical address associated with each command of the subset of commands; and
performing, as part of the test mode, the subset of commands according to the second sequence.

20. The method of claim 19, wherein configuring the second sequence comprises:
adjusting an order of the subset of commands in the queue such that a first logical address associated with a first command in the queue is less than a second logical address associated with a second command in the queue, wherein the second command is performed after the first command according to the second sequence.

21. The method of claim 19, wherein performing the subset of commands comprises:
writing first data associated with at least one command of the subset of commands to a first block based at least in part on determining that the subset of commands is associated with the test mode.

22. The method of claim 21, further comprising:
performing a second subset of commands in the set of commands, the second subset different than the subset.

23. An apparatus, comprising:
a controller configured to couple with a memory system, wherein the controller is configured to cause the apparatus to:
store, in a queue at a host system, a set of commands for storing data at a memory system according to a first sequence;
determine whether a subset of commands in the set of commands are associated with a test mode;
configure, based at least in part on determining that the subset of commands are associated with the test mode, a second sequence of the set of commands in the queue, the second sequence based at least in part on a respective logical address associated with each command of the subset of commands; and
transmit the subset of commands to the memory system according to the second sequence.

24. The apparatus of claim 23, wherein determining that the subset of commands in the set of commands are associated with the test mode is based at least in part on a respective size of data associated with each command of the subset satisfying a threshold.

25. The apparatus of claim 23, wherein configuring the second sequence is configured to cause the apparatus to:
adjust an order of the subset of commands in the queue such that a first logical address associated with a first command in the queue is less than a second logical address associated with a second command in the queue, wherein the second command is configured to be performed after the first command according to the second sequence.

* * * * *